(12) United States Patent
Barzel et al.

(10) Patent No.: US 12,373,754 B2
(45) Date of Patent: Jul. 29, 2025

(54) EFFICIENTLY PROVIDING DATA IN A CLOUD PIPELINE TO GEOGRAPHICALLY DISTRIBUTED USERS

(71) Applicant: Unity Technologies SF, San Francisco, CA (US)

(72) Inventors: Ronen Barzel, Edinburgh (GB); Joseph W. Marks, Boston, MA (US); Kimball D. Thurston, III, Wellington (NZ); Peter M. Hillman, Wellington (NZ); Graeme Demmocks, Wellington (NZ); Gary Major, Wellington (NZ); Carter Bart Sullivan, Benicia, CA (US)

(73) Assignee: Unity Technologies SF, San Francisco, CA (US)

( * ) Notice: Subject to any disclaimer, the term of this patent is extended or adjusted under 35 U.S.C. 154(b) by 295 days.

(21) Appl. No.: 18/160,938

(22) Filed: Jan. 27, 2023

(65) Prior Publication Data

US 2024/0257005 A1 Aug. 1, 2024

(51) Int. Cl.
  *G06Q 10/0631* (2023.01)
  *G06Q 10/0633* (2023.01)
  *G06Q 10/1093* (2023.01)

(52) U.S. Cl.
  CPC ............... *G06Q 10/06316* (2013.01); *G06Q 10/063114* (2013.01); *G06Q 10/0633* (2013.01); *G06Q 10/1097* (2013.01)

(58) Field of Classification Search
  CPC ..... G06Q 10/06316; G06Q 10/063114; G06Q 10/0633; G06Q 10/1097
  See application file for complete search history.

(56) References Cited

U.S. PATENT DOCUMENTS

| | | | | |
|---|---|---|---|---|
| 6,473,794 | B1* | 10/2002 | Guheen | H04L 43/50 |
| | | | | 709/224 |
| 2006/0059253 | A1* | 3/2006 | Goodman | G06Q 10/10 |
| | | | | 709/223 |
| 2010/0048242 | A1* | 2/2010 | Rhoads | G06V 10/56 |
| | | | | 455/556.1 |
| 2010/0274816 | A1* | 10/2010 | Guzik | H04N 21/4223 |
| | | | | 348/207.99 |

(Continued)

OTHER PUBLICATIONS

Ahn, et al., "A novel Cloud-based Fog Computing Network Architecture for Smart Factory Big Data Applications", 2018 South-Eastern European Design Automation, Computer Engineering, Computer Networks and Society Media Conference (SEEDA_CECNSM) (2018, pp. 1-7) (Year: 2018).*

*Primary Examiner* — Amber A Misiaszek
(74) *Attorney, Agent, or Firm* — Perkins Coie LLP

(57) ABSTRACT

The system efficiently distributes data in a cloud pipeline to geographically distributed users. To enable efficient distribution of resources to multiple users, the production pipeline can be represented as two flow graphs: a flow graph of tasks as well as a flow graph of data. The flow graph of tasks can indicate a sequence of tasks, departments, and users in a production pipeline. The flow graph of data can indicate location of data needed for each task in the flow graph of tasks, and location of the users assigned to the particular task. Based on the next task that needs to be executed in the flow graph of tasks, the system can proactively gather the data from the various locations and deliver the data to the users assigned to executing the next task.

20 Claims, 8 Drawing Sheets

(56) References Cited

U.S. PATENT DOCUMENTS

2014/0046956 A1* 2/2014 Zenger .............. G06F 16/24535
                                                      707/748
2019/0188046 A1* 6/2019 Florissi ................ G06F 16/182

* cited by examiner

EFFICIENTLY PROVIDING DATA IN A CLOUD PIPELINE TO GEOGRAPHICALLY DISTRIBUTED USERS

BACKGROUND

Cloud-based systems can be slow due to server latency. In addition, various users working on various parts of a movie production pipeline can be geographically distantly located. Migrating files between various users in a production pipeline can become an arduous and frustrating issue due to latency.

SUMMARY

The system efficiently distributes data in a cloud pipeline to geographically distributed users. To enable efficient distribution of resources to multiple users, the production pipeline can be represented as two flow graphs: a flow graph of tasks as well as a flow graph of data. The flow graph of tasks can indicate a sequence of tasks, departments, and users in a production pipeline, e.g., video game or movie production pipeline. The flow graph of data can indicate location of data needed for each task in the flow graph of tasks, and location of the users assigned to the particular task. Based on the next task that needs to be executed in the flow graph of tasks, the system can proactively gather the data from the various locations and deliver the data to the users assigned to executing the next task. When the user logs in to the system, all the resources needed to complete the next task are available to the user, without the user having to wait to gather the resources.

BRIEF DESCRIPTION OF THE DRAWINGS

Detailed descriptions of implementations of the present invention will be described and explained through the use of the accompanying drawings.

Figure 1:
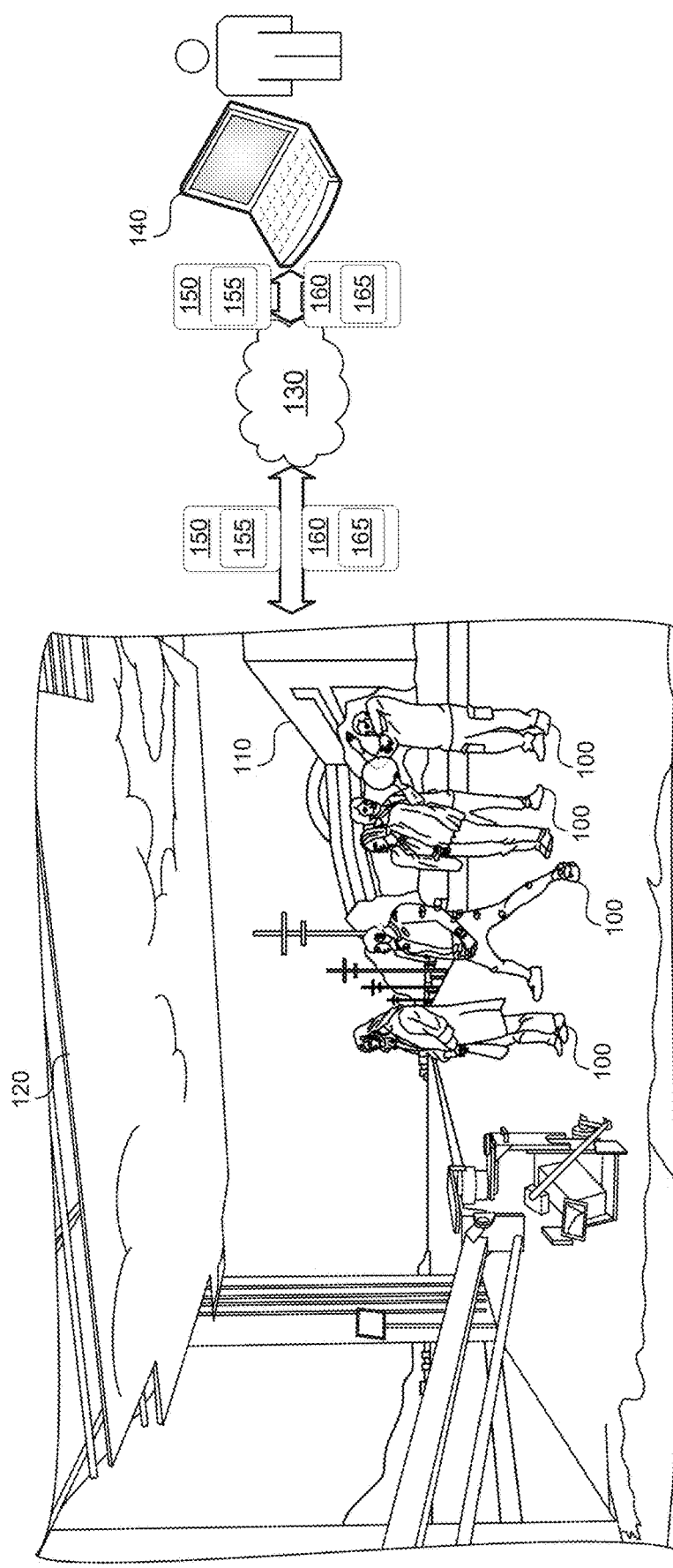
FIG. 1 shows a portion of a geographically distributed production pipeline.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The system efficiently distributes data in a cloud pipeline to geographically distributed users. To enable efficient distribution of resources to multiple users, the production pipeline can be represented as two flow graphs: a flow graph of tasks as well as a flow graph of data. The flow graph of tasks can indicate a sequence of tasks, departments, and users in a production pipeline, e.g., video game or movie production pipeline. The flow graph of data can indicate location of data needed for each task in the flow graph of tasks, and location of the users assigned to the particular task. Based on the next task that needs to be executed in the flow graph of tasks, the system can proactively gather the data from the various locations and deliver the data to the users assigned to executing the next task. When the user logs in to the system, all the resources needed to complete the next task are available to the user, without the user having to wait to gather the resources.

When the data requested by the user cannot be efficiently provided to the user, the system can create a lower resolution proxy of the data and deliver the reduced-fidelity data to the user. The reduced fidelity data can include low-resolution data, such as reduced frame rate data, or a reduced resolution of an image in an image or a video sequence. The user can work on the reduced-fidelity data, and the system can automatically apply the reduced-fidelity data edits to the high-resolution data. For example, the system can upload reduced-fidelity images from the set to the Unity server and make the reduced-fidelity images available to the user that is next in the pipeline to process them. For example, the user can be an editor who can get the reduced-fidelity images of the shoot, work on them, and cut them while the high-resolution images are being uploaded to the server. Once the high-resolution images are uploaded, the same cuts can be applied to the high-resolution images.

Another aspect of this invention is to provide metadata for the resources, e.g., images, that indicate time and place for the captured images, and the purpose for which they were captured. Based on the metadata, the system can determine to which task in the flow graph of tasks, and to which user in the flow graph of tasks, the resource should be delivered. Consequently, the system can efficiently distribute the resources to multiple users in various locations. To make the determination, the system can rely on artificial intelligence (AI) to predict when the resources would be needed.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Efficiently Providing Data in a Cloud Pipeline to Geographically Distributed Users FIG. 1 shows a portion of a geographically distributed production pipeline. For example, the actors 100 can be recorded in one location, such as California. The set 110 can be recorded in a different location, such as Australia, and can be shown on a green screen 120 in front of which the actors 100 are performing. The user can be located in a third location, such as Ireland. Consequently, the data 150, e.g., the performance captured in California, needs to be sent over the network 130 to the user's device 140.

The network 130 can be too slow to communicate all the data 150 to the user's device 140 efficiently. For example, the user may need to work on the data 150 at a particular time, such as 2 hours from now, but the data 150 includes a high-resolution video of the captured performance and the network 130 may not be able to deliver the high-resolution video of the data 150 to the user's device 140. In such a case, the system can determine the network speed by running a speed test. The network can determine the expected time when the user needs the data 150.

In one embodiment, to determine the expected time, the system can rely on AI to predict when the resources would be needed. In another embodiment, to determine the expected time, the system can determine when the user's workday starts. Based on the current time and the expected time, the system can determine when the data needs to be delivered to the user. The system can also determine the size of the data 150 at high resolution.

In a third embodiment, the system can determine whether the user has performed any work associated with the data 150. If the user is in the early stages of work, the system can determine that a reduced-fidelity data version 160 is useful to the user, and can generate the reduced-fidelity version of data 150. If the user is in the final stages of completing the work associated with the data 150, the system can decide not to create the reduced-fidelity data version 160. Further, if the system has uploaded an earlier version of the data 150 previously, to upload the data 150, the system can determine the difference between the current version of the data 150 and the earlier version of the data 150, and can only upload the difference, thus speeding up the delivery of the data 150. Similarly, the user's device 140 can upload only the changes that the user makes to the data, as opposed to the full version of the modified data.

Based on the network speed, and the size of the data 150 at high resolution, the system can determine the amount of time needed to deliver the data from California to the user's device 140 in Ireland, by:

time needed to deliver the data to the user's device=network speed/size of the data.

The system can determine that the time needed to deliver the data 150 to the user's device 140 exceeds the time within which the data needs to be delivered to the user. Consequently, the system can determine the maximum size of data that can be delivered before the expected time, by:

maximum size of data that can be delivered=network speed/(expected time−current time).

Upon determining the maximum size of the data that can be delivered, the system can decimate the data 150 to generate a reduced-fidelity data version 160 whose size does not exceed the maximum size. The system can send the reduced-fidelity data version 160 to the user's device 140 before or at the expected time.

If the reduced-fidelity data version 160 is not needed, the system can upload high-resolution data 150 and distribute the data to the users. If the reduced-fidelity data version 160 is needed, the system can upload the reduced-fidelity data version first. Simultaneously or at a later time, the system can upload the high-resolution data 150.

The data 150 can be the video, motion capture data, geometry scans of objects, audio, metadata, etc. Depending on the type of the data, the system can perform the appropriate estimation. For example, if the data 150 is video, the system can reduce the resolution of the data 150 to create the reduced-fidelity version of the data 160. Alternatively, or in addition, if the data 150 is video, the system can reduce the number of frames per second in the reduced-fidelity version of the data 160. If the data 150 is a geometry scan of an object, the system can remove vertices from the data. If the data is motion capture data, the system can reduce the number of frames per second in the reduced-fidelity version of the data 160.

Once the user's device 140 receives the data, the user can perform modifications on the reduced-fidelity data version 160. When the high-resolution data 150 is uploaded, the system can transfer the modifications from the reduced-fidelity data version 160 to the high-resolution data 150.

To identify that the data 150 and the reduced-fidelity data version 160 are related, each data 150, 160 can have an identifier (ID) 155, 165. The IDs 155, 165 can be the same, or at least a portion of the IDs 155, 165 can be the same.

For example, the ID 155 associated with the data 150 can be an alphanumeric character uniquely identifying the data 150, which in addition indicates that the data is high-resolution data. Similarly, the ID 165 associated with the data 160 can be the same alphanumeric character uniquely identifying the data 160, which in addition indicates that the data is reduced-fidelity data. Specifically, the ID 155 can be 1A!d8a.1, while the ID 165 can be 1A!d8a.0. The portion of the IDs 155, 165 "1A!d8a", is the same, while the "0.1" and "0.0" indicate that the IDs correspond to high-resolution and reduced-fidelity data, respectively.

To transfer modifications from the reduced-fidelity data version 160 to the high-resolution data 150, the system can adopt an appropriate technique depending on the type of data. In one embodiment, if the reduced-fidelity version of the data 160 is audio/video, and the modifications are audio/video editing, i.e., determining cut and splice points, the modifications to the reduced-fidelity version of the data 160 are based on metadata (time) rather than content. The system can retrieve the metadata from the reduced-fidelity data version 160 and the metadata from the high-resolution data 150, can match the metadata, and, based on the matches, can transfer the modifications.

In another embodiment, if the reduced-fidelity data version 160 is an image, and the modification includes image editing operations, the operations can be resolution independent (e.g., color balance of the image). Consequently, the modification can be transferred to the high-resolution data 150.

In a third embodiment, if the reduced-fidelity data version 160 is an image, and the modification includes image editing operations that depend on the resolution, an image processing system such as an AI can compare the before/after reduced-fidelity images, and perform the analogous edit on high-resolution images.

In a fourth embodiment, if the reduced-fidelity data version 160 is an image, and the modification includes image editing operations that depend on the resolution such as painting or pixel modification, the system can capture the sequence of operations applied to the reduced-fidelity data version 160. When the high-resolution data 150 becomes available, the system can reapply the sequence of operations to the high-resolution data.

Figure 2:
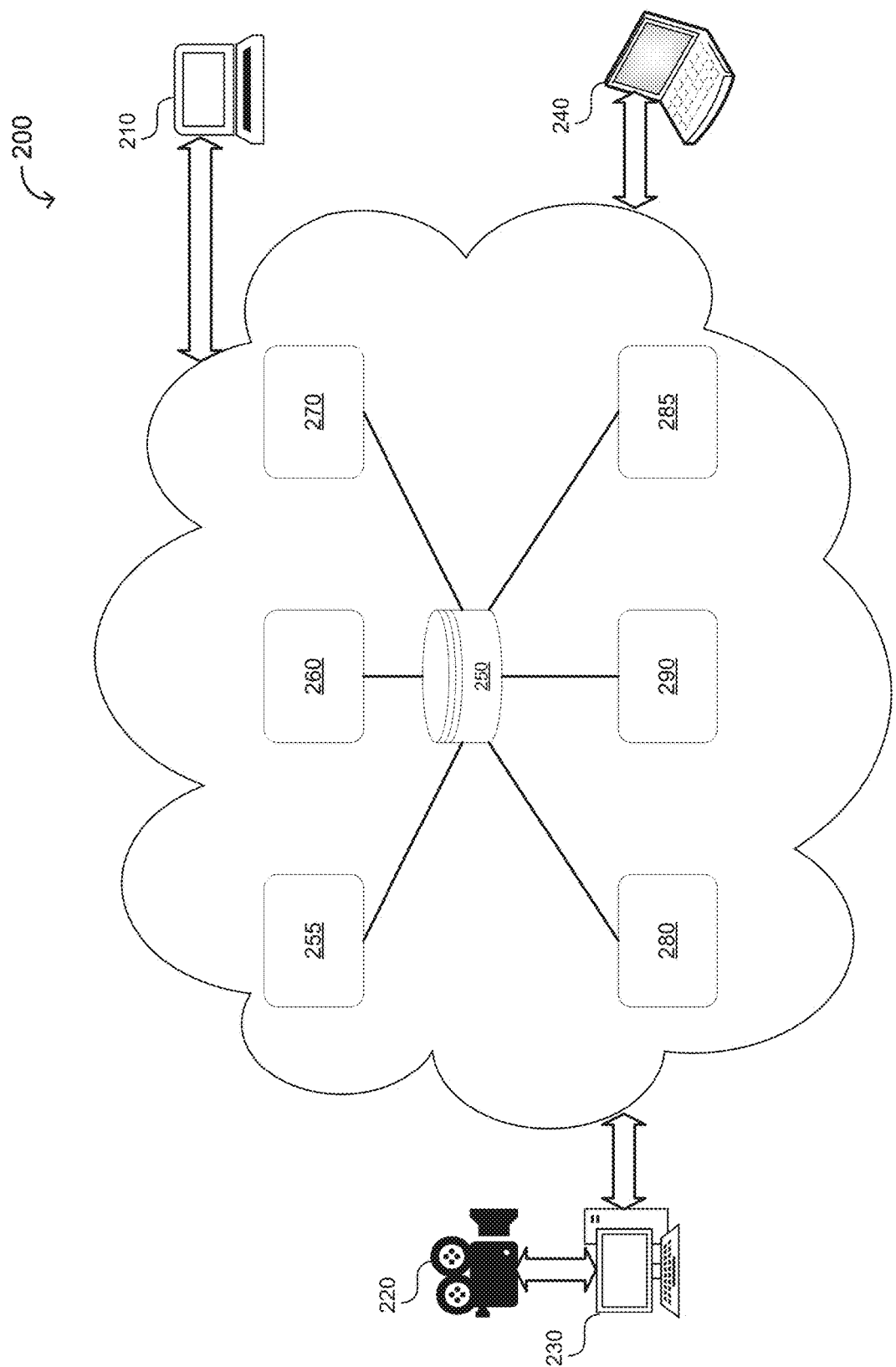
FIG. 2 shows the system to efficiently provide data in a cloud pipeline to geographically distributed users.

FIG. 2 shows the system to efficiently provide data in a cloud pipeline to geographically distributed users. The system 200 includes a data entry mechanism 210, one or more data sources 220, on-premises processing 230, user workstation endpoints 240, cloud storage 250, flow graph analyzer 255, resource tracker 260, analysis module 270, level of detail (LOD) generator 280, delivery module 285, and modification transferring component 290.

The data entry mechanism 210 enables the user to enter workflow and dataflow descriptions, represented by a flow graph of tasks and a flow graph of data, respectively, and update them. The data source 220 can be the data 150 in FIG. 1 generated on location, for example, in California, the recording to show on the green screen generated in Australia a three-dimensional model generated by a remote user, etc.

On-premises processing 230 can be geographically located at each data source 220. The on-premises processing 230 can have the computational resources to determine the network bandwidth, and to create reduced-fidelity data to upload more quickly.

User workstation endpoints 240 are the receivers of the data 150. The system 200 delivers the data 150 to the user workstation endpoints 240. The user workstation endpoints 240 also generate modifications to the data 150. The system can transfer the data 150 from the user workstation endpoints 240 to the cloud storage 250.

Cloud storage 250 can be a database in the clouds storing the data 150, or the reduced-fidelity data version 160.

Flow graph analyzer 255 can be a cloud component that analyzes resources and determines tasks, users, and their locations. The flow graph analyzer 255 can respond to new data being available or new tasks being described.

Resource tracker 260 can be a cloud component that keeps track of the data resources: which have been uploaded, which have reduced-fidelity versions, data that has been edited by users (reduced-fidelity or high-resolution), data that is the result of transfer of reduced-fidelity edits to high-resolution, etc.

Analysis module 270 can be a cloud component that analyzes data size and network bandwidth and determines when data will be available to relevant users, at full resolution or at various LODs.

LOD generator 280 can be a cloud component that can create LODs if they were not created using on-premises processing 230.

The delivery module 285 can be a cloud component to deliver to users all the data they need to perform their task. Modification transferring component 290 can be a cloud component to transfer edits from reduced-fidelity to high-resolution data.

Figure 3:
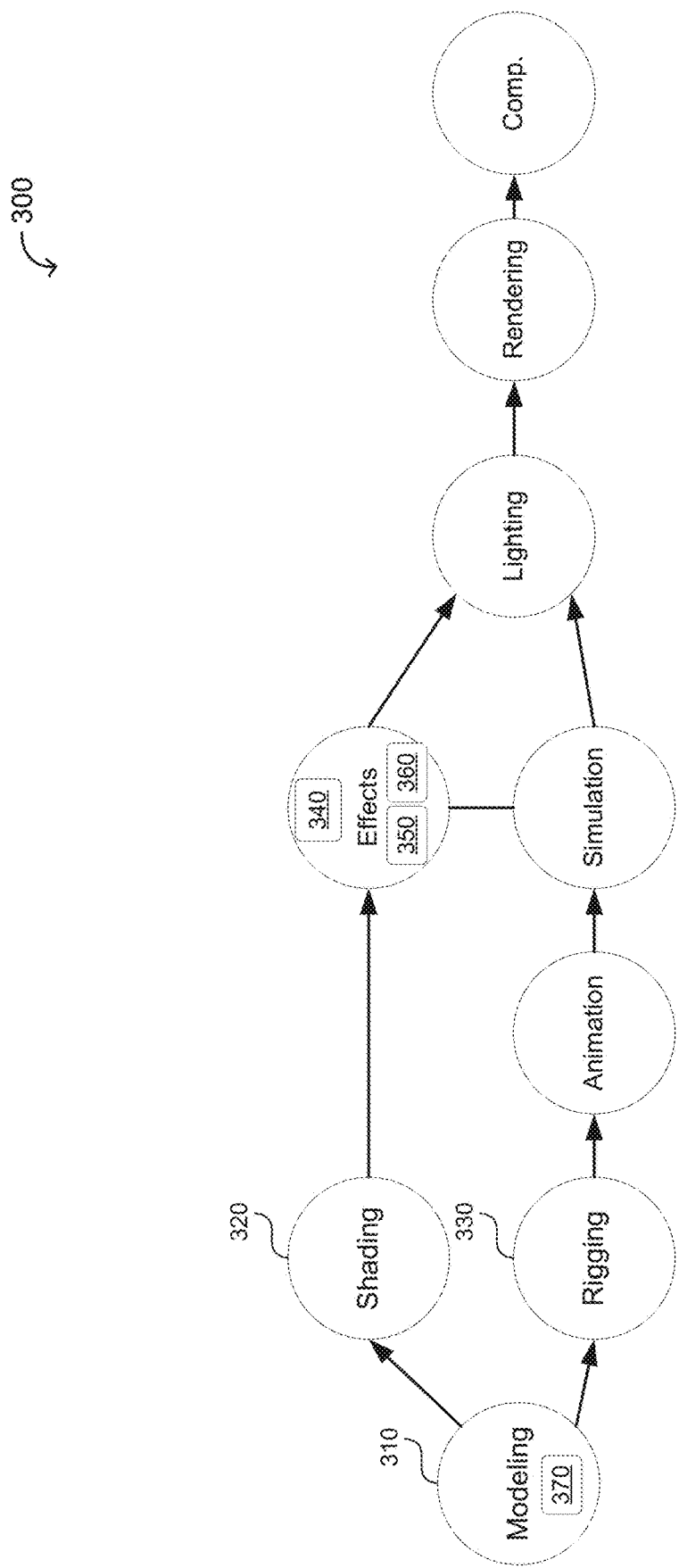
FIG. 3 shows a flow graph of tasks in a production pipeline.

FIG. 3 shows a flow graph of tasks in a production pipeline. The flow graph of tasks 300 includes multiple tasks 310, 320, 330 (only three labeled for brevity). The flow graph of tasks 300 indicates a sequence of tasks in the production pipeline. For example, in the initial task 310, modeling, a three-dimensional model of an object is created. After modeling, the three-dimensional model is sent to both the shading department to perform the shading task 320 and the rigging department to perform the rigging task 330. After rigging, the three-dimensional model can be animated. After animation is complete, the character simulation of cloth and hair can be performed. After the shading and simulation are complete, the effects task can be performed to add additional details such as splashing, explosions, smoke, fire, etc. Upon completing simulation and/or effects, the lighting task can be performed to add artistic lighting to the scene. After the scene is lit, the scene can be rendered into one or more images. The rendered images can be composited together to produce the final image.

The flow graph of tasks 300 can include for each task a user 340 (only one labeled for brevity) assigned to perform the task, and a location 350 (only one labeled for brevity) associated with the user. In addition, the flow graph of tasks 300 can indicate the schedule, such as a time 360 (only one labeled for brevity) by which the task 310 needs to be completed.

Figure 4:
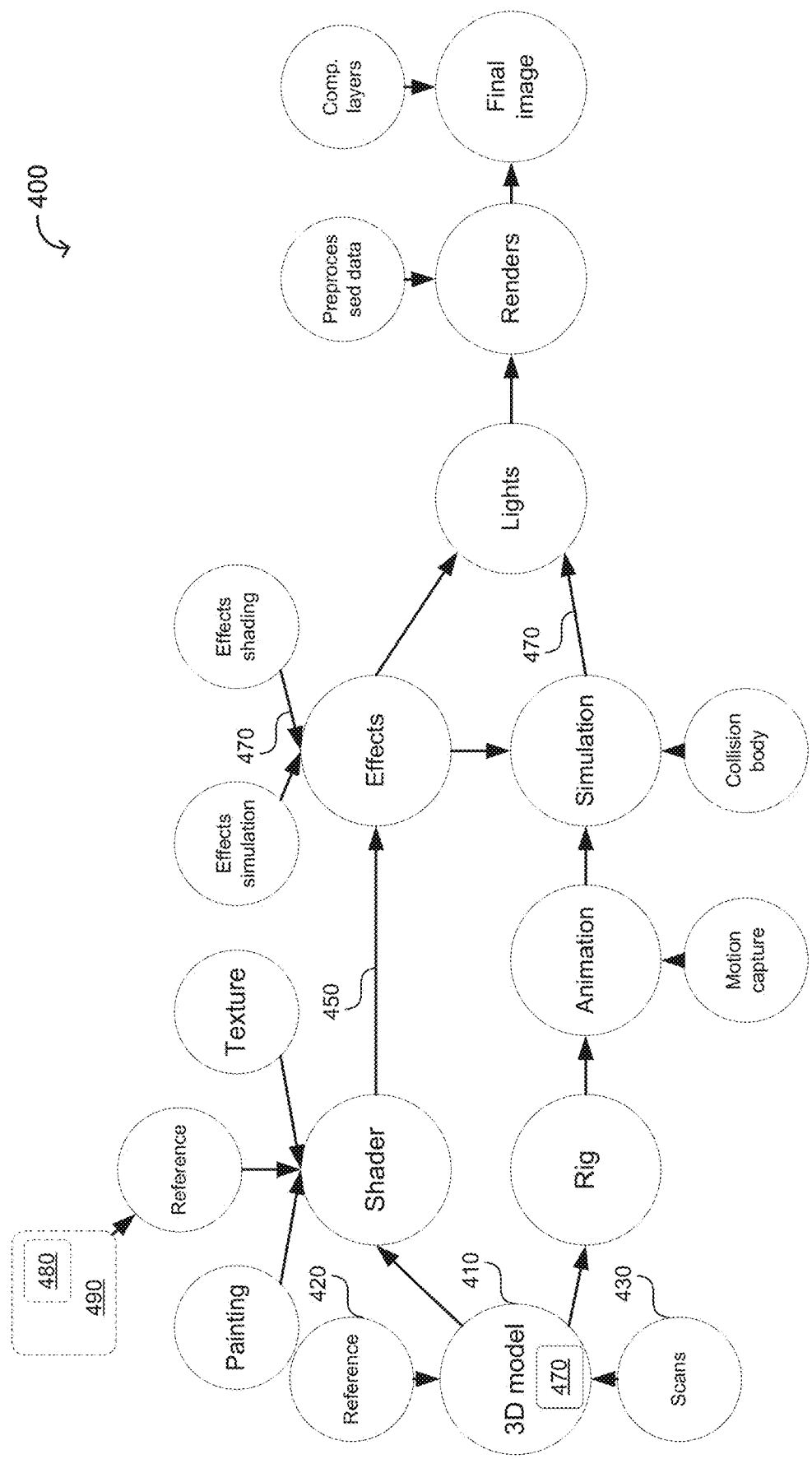
FIG. 4 shows a flow graph of data in a production pipeline.

FIG. 4 shows a flow graph of data in a production pipeline. The flow graph of data 400 includes various data 410, 420, 430 (only three labeled for brevity), and indications 440, 450, 460 (only three labeled for brevity) of the flow of data and the production pipeline. For example, to help a user or an automated system create a three-dimensional model 410, the system can provide a reference 420 and/or a scan of three-dimensional geometry 430. The reference 420 can include an image, an artwork, or a video describing an aspect of the desired three-dimensional model 410. The scan of the three-dimensional geometry can include a point cloud, a volumetric scan, or a three-dimensional representation of a surface.

To help the user or an automated system create a shader, the system can provide a reference, a texture, and/or a painting. To help the user or an automated system create an animation, the system can provide motion capture information from a live recording. To create a render, and to speed up the rendering process, the system can provide various preprocessed data from various parts of the pipeline, such as simulation information, precomputed rendering information, etc. Similarly, to help the user create an effect, the system can provide effects simulation data and effects shading data. To create the final composition, the system can provide various layers, e.g., images, to be composited to create the final image.

The system can create a correspondence between the flow graph of data 400 and the flow graph of tasks 300 in FIG. 3. Specifically, certain nodes in the flow graph of data 400 correspond to certain nodes in the flow graph of tasks 300. For example, the task of modeling 310 in FIG. 3 corresponds to the data three-dimensional model 410. Similarly, the shading task 320 in FIG. 3 corresponds to the shader in FIG. 4, the rigging task 330 in FIG. 3 corresponds to the rig in FIG. 4, and the animation, simulation, and effects correspond to each other. Lighting in FIG. 3 corresponds to the lights in FIG. 4, rendering in FIG. 3 corresponds to the renders in FIG. 4, and compositing in FIG. 3 corresponds to the final image in FIG. 4.

To denote which tasks in the flow graph of tasks 300 correspond to which data in the flow graph of data 400, the nodes that correspond to each other can contain IDs 370 in FIG. 3 (only one labeled for brevity), 470 (only one labeled for brevity). The IDs 370, 470 can be identical, or a portion of the IDs 370, 470 indicating a correspondence can be identical. For example, ID 370 can indicate 7231-1 while ID 470 can indicate 7231-0. The first portion of the IDs, "7231," can indicate that the two IDs are identical, while the second portion can indicate to which flow graph they belong. For example, "-1" can indicate belonging to the flow graph of tasks 300, while "-0" can indicate belonging to the flow graph of data 400.

When new data 490 is added to the production pipeline, such as a new reference image to be used in modeling, the system can receive metadata 480 from a user creating the new data. The metadata 480 can indicate a time and place for the new data 490, and the purpose for which the data was captured. In addition, the metadata can include information such as GPS location, lens data, take number, day number, shot identifier, camera data, audio analysis, correlation of feed for multiple cameras, main camera tag, correlation to reference photos, etc.

The purpose for which the new data 490 was captured can indicate the node in the flow graph of data 400 to which the new data contributes. If the new data is to be used in modeling, the metadata can include the ID 470 of the three-dimensional model 410.

Based on the metadata 480, the system can determine which data the new data 490 influences. In the above example, the new data 490 influences the three-dimensional model 410. Consequently, the system can store the new data 490 in the appropriate node in the flow graph of data 400.

Based on the data influenced by the new data 490, the system can determine which task in the flow graph of tasks 300 the new data influences, and consequently to which user in the flow graph of tasks the new data 490 should be delivered. As described in this application, the system can efficiently distribute the resources to multiple users in various locations by creating reduced-fidelity versions of the new data 490.

Figure 5A:
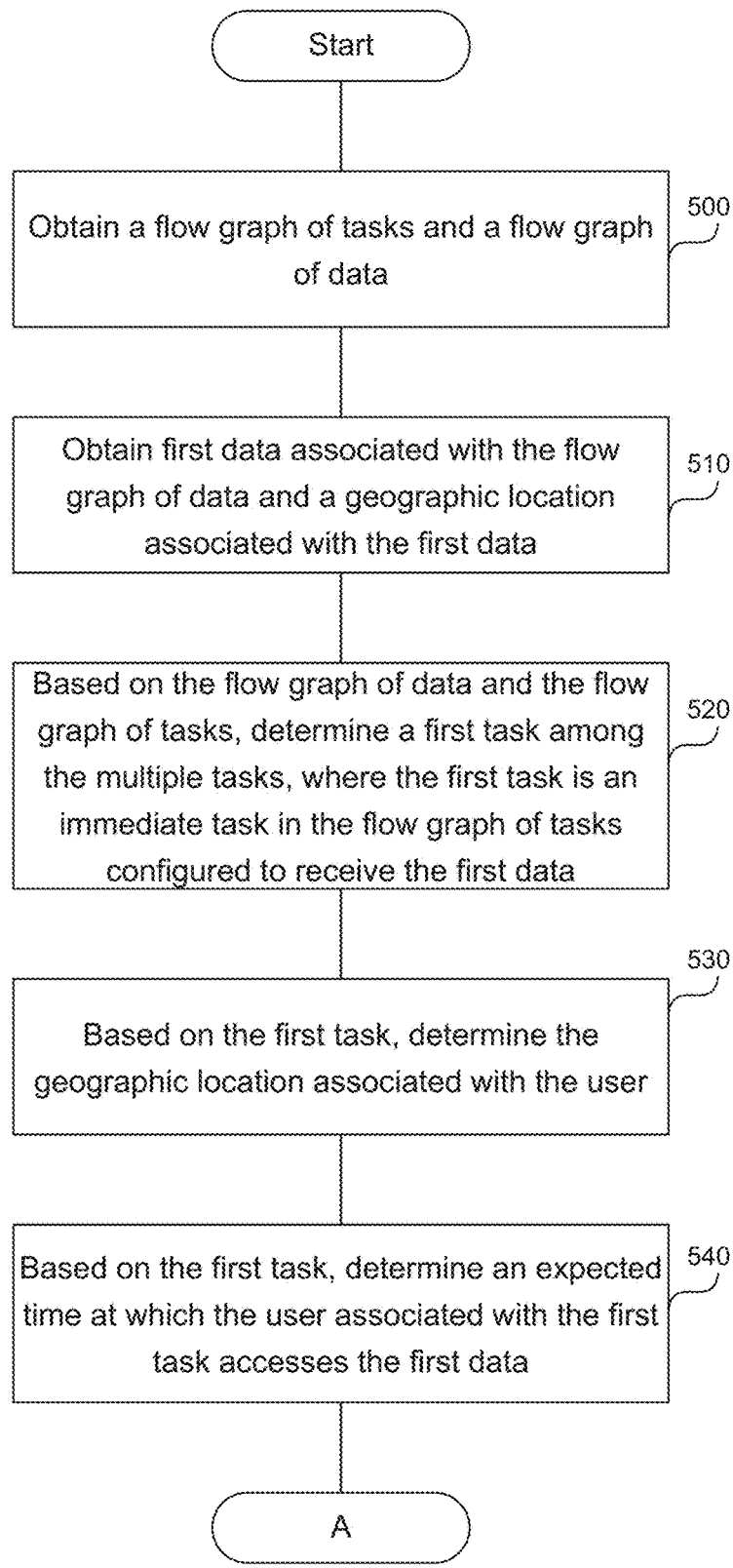
FIGS. 5A-5B are a flowchart of a method to efficiently provide data in a cloud pipeline to geographically distributed users.
Figure 5B:
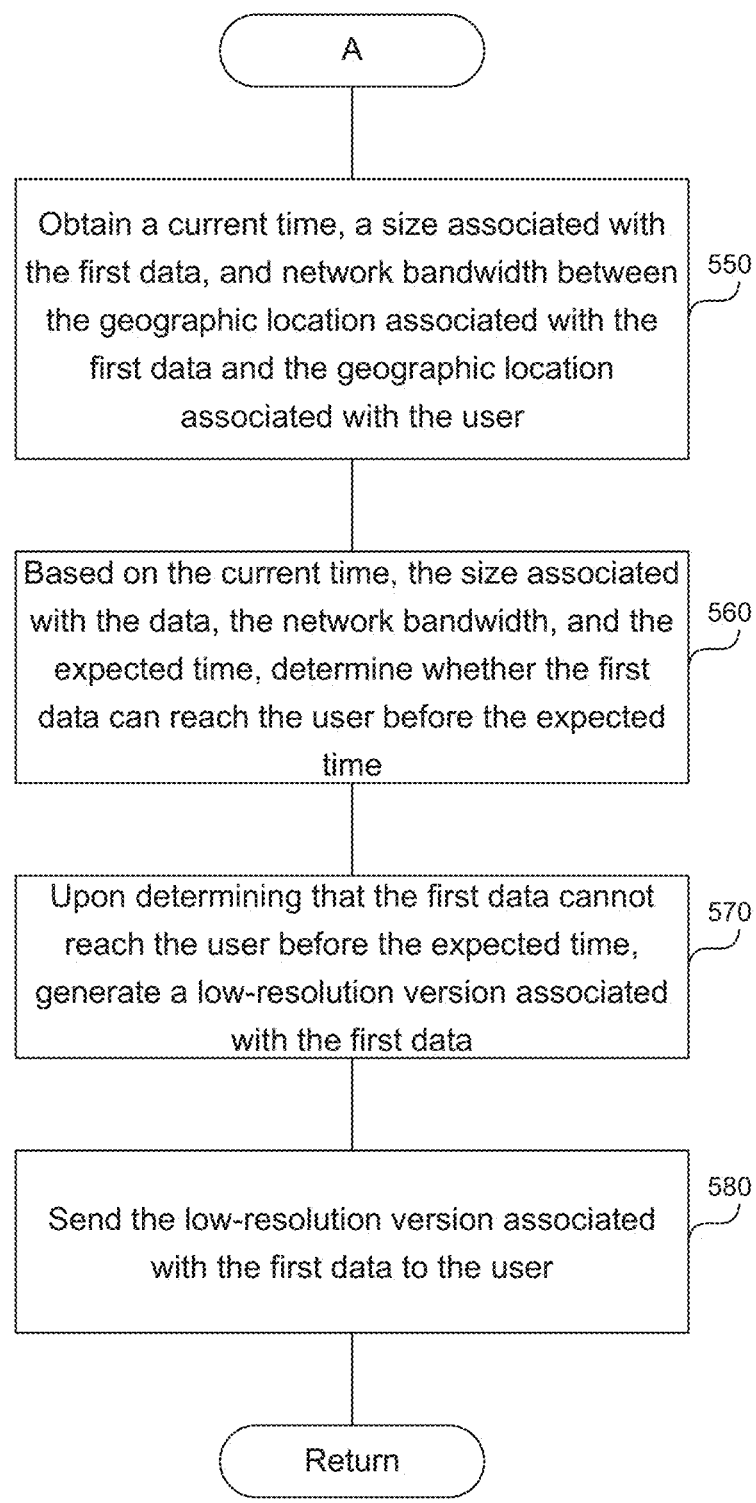

FIGS. 5A-5B are a flowchart of a method to efficiently provide data in a cloud pipeline to geographically distributed users. A hardware or software processor executing instructions described in this application can, in step 500, obtain a flow graph of tasks and a flow graph of data. The flow graph of tasks indicates multiple tasks, a user associated with a task in the multiple tasks, a location associated with the user, and an indication of network connectivity associated with the user. The flow graph of data indicates data associated with the task in the multiple tasks and a location associated with a source of the data. The location can include a geographic location, or a virtual location such as a network location, associated with the source of the data, such as the creator of the data, or the device uploading the data. The location associated with the source of the data does not include the location of the server, unless the server is the creator of the data. The network connectivity can include network bandwidth and reliability. For example, if the network bandwidth is high, but the reliability is low, the network connectivity indicator can be medium. If the network bandwidth is high and the availability is high, the network connectivity indicator can high. Alternatively, if the network bandwidth is low, but the reliability is high, the network connectivity indicator can still be medium.

The user can be a person, an AI, a device, and/or an automatic archiving system. For example, the disclosed system can be used to create a copy of data, by sending the data to the automatic archiving system. In another example, the disclosed system can be used to offload local memory. Specifically, an on-set camera recording a video can have a limited memory, and can send the recorded data to the automatic archiving system to free up the memory on camera.

In step 510, the processor can obtain first data associated with the flow graph of data and a location associated with the source of the first data. The first data can be a video, a scan of a model, motion capture data used in animation, etc.

In step 520, based on the flow graph of data and the flow graph of tasks, the processor can determine a first task among the multiple tasks, where the first task is an immediate task in the flow graph of tasks configured to receive the first data. There can be correspondence, as described in this application, between the flow graph of data and the flow graph of tasks to help determine the next task for the input data. The processor can use metadata associated with the first data to determine where the data goes in the flow graph of data.

In step 530, based on the first task, the processor can determine the location associated with the user. In step 540, based on the first task, the processor can determine an expected time at which the user associated with the first task accesses the first data.

In step 550, the processor can obtain a current time, a size associated with the first data, and network bandwidth between the location associated with the source of the first data and the location associated with the user. To obtain the network bandwidth, the processor can measure network bandwidth by performing a speed test on the bandwidth of the first leg between the user inputting the data and the server.

In step 560, based on the current time, the size associated with the first data, the network bandwidth, and the expected time, the processor can determine whether the first data can reach the user before the expected time.

In step 570, upon determining that the first data cannot reach the user before the expected time, the processor can generate a reduced-fidelity version associated with the first data, where the reduced-fidelity version associated with the first data occupies less memory than the first data. In step 580, the processor can send at least a portion the reduced-fidelity version associated with the first data to the user. Upon determining that the first data can reach the user before the expected time, the processor can send at least a portion of the first data to the user. The processor can continually monitor the network bandwidth and load, and can switch between delivering reduced-fidelity version associated with the first data, and the first data, depending on the network bandwidth. For example, the processor can initially start delivering the first data, but the network bandwidth can drop. At that point, the processor can start delivering the reduced-fidelity version associated with the first data.

To generate the reduced-fidelity version associated with the first data, based on the current time, the size associated with the first data, the network bandwidth, and the expected time, the processor can determine an upper reduced-fidelity size associated with the reduced-fidelity version associated with the first data. A network providing the network bandwidth is configured to deliver the reduced-fidelity version having the upper reduced-fidelity size before the expected time. In one embodiment, based on the upper reduced-fidelity size, the processor can decimate the first data to obtain the reduced-fidelity version associated with the first data, where the reduced-fidelity version associated with the first data occupies the same amount of memory or less memory than the memory indicated by the upper reduced-fidelity size. In another embodiment, based on the upper reduced-fidelity size, the processor can generate the reduced-fidelity version associated with the first data according to a criterion stored in the flow graph of tasks. For example, the criterion stored in the flow graph of tasks can indicate how to generate the reduced-fidelity data such as, reducing the frame rate, creating a highly compressed reduced-fidelity version, reducing the resolution, removing vertices, etc.

The processor can identify reduced-fidelity data and high-resolution data based on IDs. The processor can obtain a first ID associated with the reduced-fidelity version associated with the first data, where the first ID uniquely identifies the reduced-fidelity version associated with the first data. The processor can obtain second data and a second ID associated with the second data. The processor can determine whether at least a portion of the second ID is the same as a portion of the first ID. Upon determining that the at least a portion of the second ID is the same as the portion of the first ID, the processor can determine that the reduced-fidelity version associated with the first data and the second data represent the same information with differing fidelity. The reduced-fidelity version associated with first data and the second data can both be low resolution versions of the first data. Alternatively, the reduced-fidelity version associated with the first data can be a low-resolution version while the second data can be the full-fidelity version. When the reduced-fidelity version associated with the first data and the second data are both low-resolution versions of the first data, they can differ in how they are generated. For example, one can be a low frame rate version of the first data, while the other one can be a high compression version of the first data.

The processor can apply modifications from the low level of detail to the high level of detail, based on the ID. The processor can obtain a first ID associated with the reduced-fidelity version associated with the first data, where the first ID uniquely identifies the reduced-fidelity version associated with the first data. The processor can obtain a modification to the reduced-fidelity version associated with the first data. The processor can obtain second data and a second ID associated with the second data. The processor can determine whether at least a portion of the second ID is the same as a portion of the first ID. Upon determining that the at least a portion of the second ID is the same as the portion of the first ID, the processor can determine that the reduced-fidelity version associated with the first data and the second data represent the same information with differing fidelity. The processor can apply the modification from the reduced-fidelity version associated with the data to the first data.

In one embodiment, to determine the expected time at which the user associated with the first task accesses the first data, the processor can determine whether the user is active at the current time. Upon determining that the user is active at the current time, the processor can determine the expected time to be the current time. Upon determining that the user is not active at the current time, the processor can obtain an indication of past start times associated with the user. Based on the indication of past start times associated with the user, the processor can determine the expected time.

In another embodiment, to determine the expected time, the processor can obtain a schedule associated with the user and the first task, where the schedule indicates availability of the user, such as the user's work time, when the user is out of the office, etc. Based on the schedule, the processor can determine a user's requirement time associated with the data, where the user's requirement time indicates anticipated utilization time associated with the first data. The anticipated utilization time can be a time before the due date of the task minus an anticipated amount of time it would take the user to complete the task once the data is available. Based on the indication of user's requirement time, the processor can determine the expected time.

The processor can determine if the expected time allows for the delivery of the first data, and the time window within which the first data can be delivered. For example, if the time to deliver the first data is three hours, and the expected time is 24 hours from the current time, the processor can determine when to start delivery of the first data. For example, if the network load is currently high, the processor can delay the delivery of the first data until three hours before the expected time. That way, the processor can balance network load based on the expected time and the time needed to deliver the first data.

To determine the first task among the multiple tasks based on the flow graph of data and the flow graph of tasks, the processor can obtain a correspondence between the flow graph of data and the flow graph of tasks. The correspondence indicates the first data in the flow graph of data and the first task in the flow graph of tasks depending on the data. The processor can obtain a metadata associated with the first data, where the metadata indicates a place of the first data in the flow graph of data. Based on the correspondence between the flow graph of data and the flow graph of tasks and the place of the first metadata in the flow graph of data, the processor can determine the first task among the multiple tasks.

Visual Content Generation System

Figure 6:
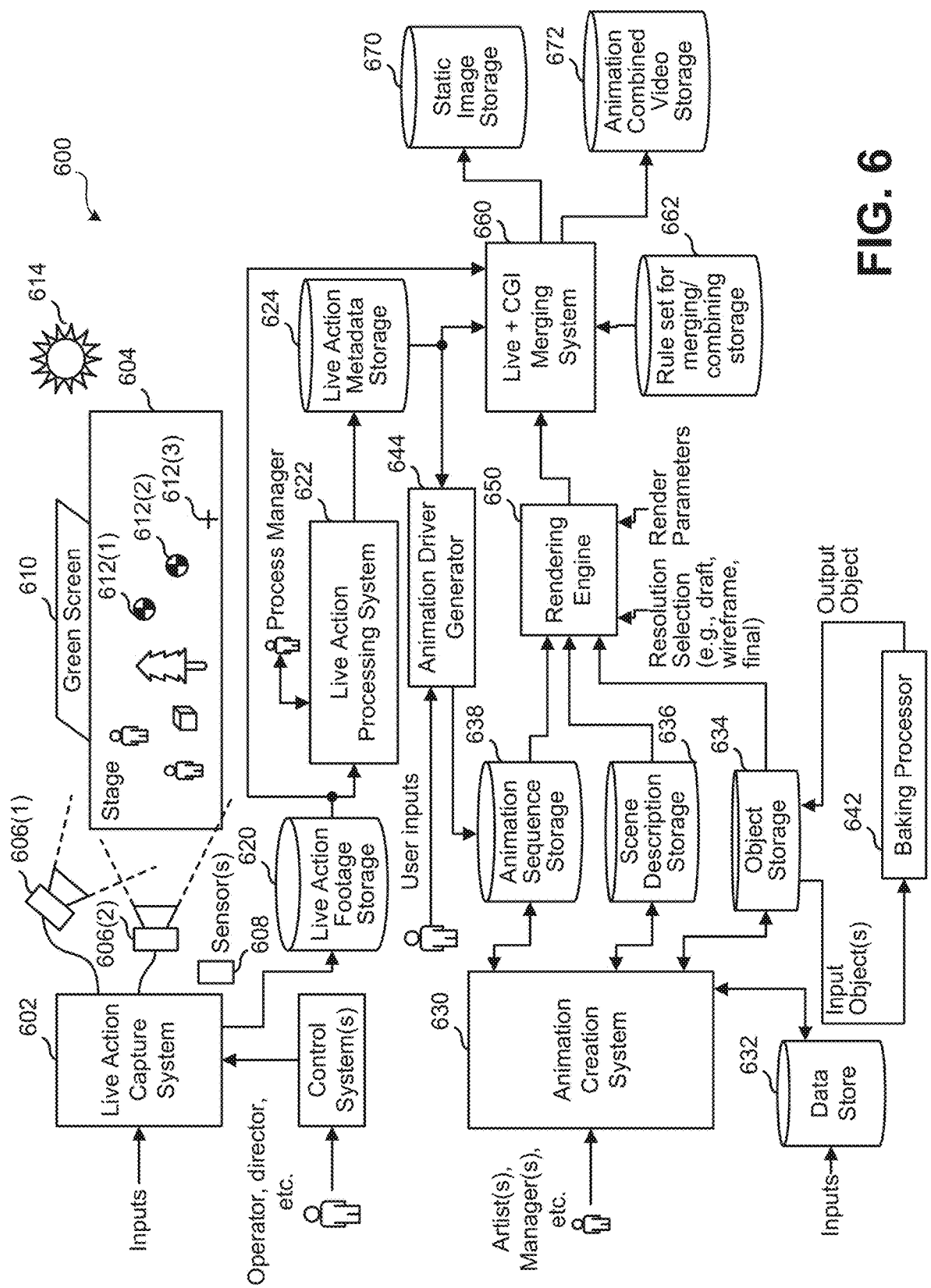
FIG. 6 illustrates an example visual content generation system as might be used to generate imagery in the form of still images and/or video sequences of images.

FIG. 6 illustrates an example visual content generation system 600 as might be used to generate imagery in the form of still images and/or video sequences of images. Visual content generation system 600 might generate scenes of live action imagery, scenes of computer-generated imagery (sometimes known as CGI), or a combination thereof. In a practical system, users are provided with tools that allow them to specify, at high levels and low levels where necessary, what is to go into that imagery. For example, a user might be an animation artist and might use visual content generation system 600 to capture interaction between two human actors performing live on a sound stage. The user might replace one of the human actors with a computer-generated anthropomorphic non-human being that behaves in ways that mimic the replaced human actor's movements and mannerisms, and then add a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows, 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations, and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might or might not include color values, and might include depth values, alpha values, weight values, object identifiers, or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (FPS), 50 FPS, 340 FPS, or other frame rates. In some embodiments, frames are interlaced or otherwise presented for display, but for clarity of description, it is assumed, in some examples, that a video frame has one specified display time; other variations might be contemplated, however.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for storytelling or other purposes often calls for scenes that cannot be created with live actors, such as scenes involving a talking tree, an anthropomorphic object, space battles, and the like. Such video sequences might be generated computationally rather than by capturing light from live scenes. In some instances, an entirety of a video sequence might be generated computationally, as in the case of a computer-animated feature film. In some video sequences, it is desirable to have some computer-generated imagery and some live action, perhaps with careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), which might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, locations of objects in a live action scene, a location of a camera relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate data representing objects (e.g., a horse, a human, a ball, a teapot, a cloud, a light source, a texture, etc.) and output such data to an object storage 634, generate data representing a scene and output such data into a scene description storage 636, and/or generate data representing animation sequences and output such data to an animation sequence storage 638.

Scene data might indicate locations of objects and other visual elements, values of their parameters, lighting, camera location, camera view plane, and other details that a rendering engine 650 might use to render computer-generated imagery. For example, scene data might include the locations of several articulated characters, background objects, lighting, etc., specified in a two-dimensional space, three-dimensional space, or other dimensional space (such as a 2.5-dimensional space, a space in three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible, and the camera view plane could be different for different shapes.

Animation creation system 630 might be interactive, allowing a user to read in animation sequences, scene descriptions, object details, etc., and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters, and then save a baked object that is a simplified object with now-fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2"; at a lower level, such as "move the elbow joint 2.5 degrees per frame"; or even at a very high level, such as "character A should move, consistent with the laws of physics that are given for this scene, from point P1 to point P2 along a specified path."

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a computer-generated object. This can be useful where a live action scene involving a human actor is captured while the actor is wearing motion capture fiducials (e.g., high-contrast markers outside the actor's clothing, high-visibility paint on the actor's skin, face, etc.) and the movement of those fiducials is determined by live action processing system 622. Animation driver generator 644 might convert that movement data into specifications of how joints of an articulated computer-generated character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining computer-generated imagery from rendering engine 650.

Merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify certain tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely computer-generated sequences. The code may also be provided and/or carried by a transitory computer-readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices, or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal, or an electrical signal.

Computer System

Figure 7:
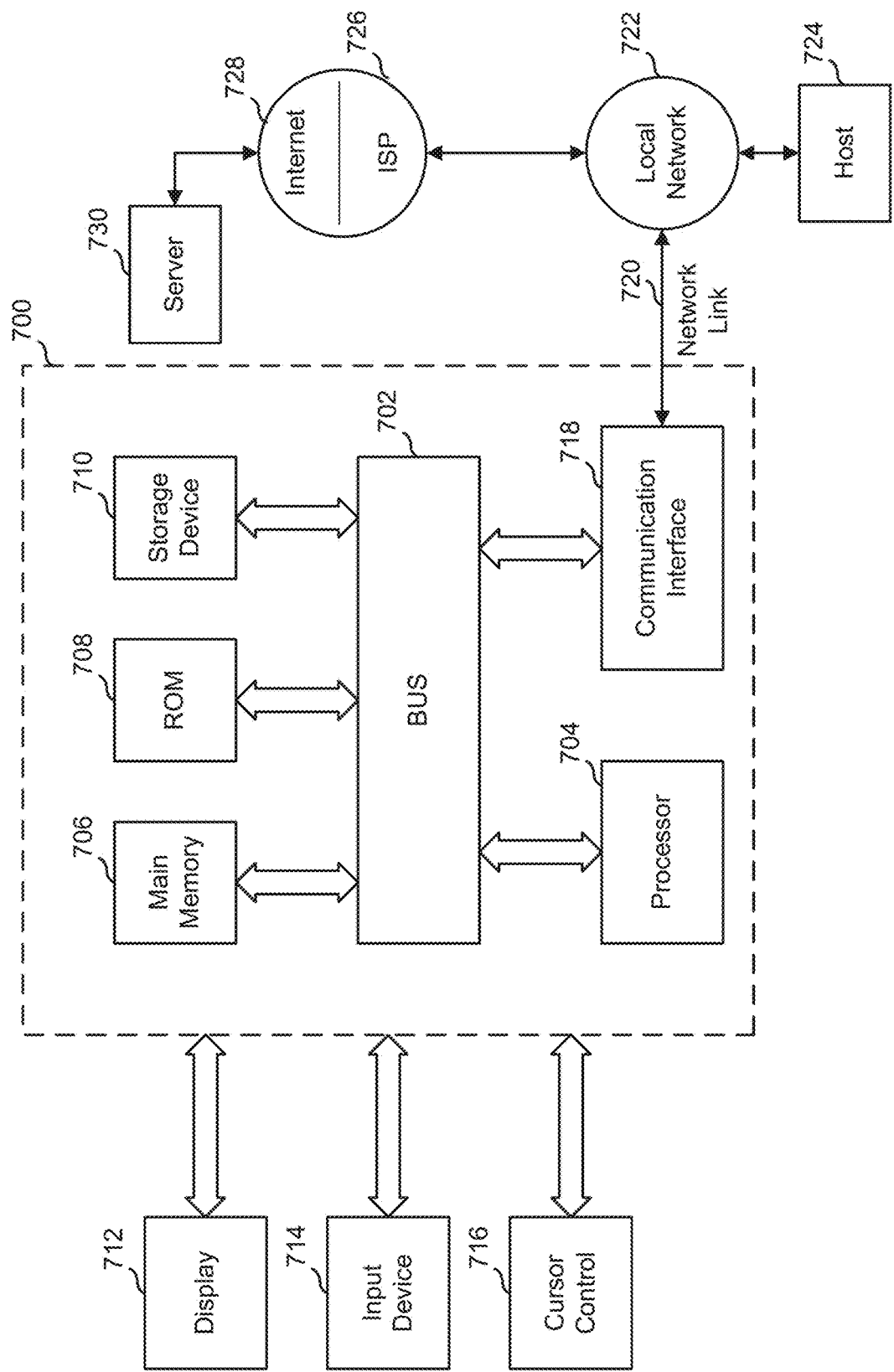
FIG. 7 is a block diagram that illustrates a computer system upon which the computer systems of the systems described herein and/or the visual content generation system in FIG. 6 may be implemented.

FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read-only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware, and/or program logic which, in combination with the computer system, causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, a hard disk, a solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, or any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infrared data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710 or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided and/or carried by a transitory computer-readable medium, e.g., a transmission medium such as in the form of a signal transmitted over a network.

Conjunctive language, such as phrases of the form "at least one of A, B, and C" or "at least one of A, B, or C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
    at least one hardware processor; and
    at least one non-transitory memory storing instructions, which, when executed by the at least one hardware processor, cause the system to:
        obtain a flow graph of tasks and a flow graph of data,
            wherein the flow graph of tasks indicates multiple tasks, a particular user associated with a task in the multiple tasks, a location associated with the particular user, and an indication of network connectivity associated with the particular user,
            wherein the flow graph of data indicates data associated with the task in the multiple tasks and a location associated with a source of the data;
        obtain first data associated with the flow graph of data and a location associated with a source of the first data;
        based on the flow graph of data and the flow graph of tasks, determine a first task among the multiple tasks, wherein the first task is an immediate task in the flow graph of tasks configured to receive the first data;
        based on the first task, determine the location associated with a user associated with the first task;
        based on the first task, determine an expected time at which the user associated with the first task accesses the first data;
        obtain a current time, a size associated with the first data, and network bandwidth between the location associated with the source of the first data and the location associated with the user;
        based on the current time, the size associated with the first data, the network bandwidth, and the expected time, without sending the first data to the user determine whether the first data can reach the user before the expected time;
        efficiently distribute data in a cloud computing pipeline to geographically distributed users by:
            upon determining that the first data cannot reach the user before the expected time, generating a reduced-fidelity version associated with the first data,
                wherein the reduced-fidelity version associated with the first data occupies less memory than the first data; and
                sending at least a portion of the reduced-fidelity version associated with the first data to the user; and
            upon determining that the first data can reach the user before the expected time, send at least a portion of the first data to the user.

2. The system of claim 1, wherein the instructions to generate the reduced-fidelity version associated with the first data comprise instructions to:
    based on the current time, the size associated with the first data, the network bandwidth, and the expected time, determine an upper reduced-fidelity size associated with the reduced-fidelity version associated with the first data,
        wherein a network providing the network bandwidth is configured to deliver the reduced-fidelity version having the upper reduced-fidelity size before the expected time; and
    based on the upper reduced-fidelity size, generate the reduced-fidelity version associated with the first data according to a criterion stored in the flow graph of tasks, wherein the reduced-fidelity version associated with the first data occupies the same amount of memory or less memory than the memory indicated by the upper reduced-fidelity size.

3. The system of claim 1, comprising instructions to:
    obtain a first identifier (ID) associated with the reduced-fidelity version associated with the first data,
        wherein the first ID uniquely identifies the reduced-fidelity version associated with the first data;
    obtain second data and a second ID associated with the second data;

determine whether at least a portion of the second ID is the same as a portion of the first ID; and upon determining that the at least a portion of the second ID is the same as the portion of the first ID, determine that the reduced-fidelity version associated with the first data and the second data represent the same information with differing fidelity.

4. The system of claim 1, comprising instructions to:

obtain a first identifier (ID) associated with the reduced-fidelity version associated with the first data,
wherein the first ID uniquely identifies the reduced-fidelity version associated with the first data;

obtain a modification to the reduced-fidelity version associated with the first data;

obtain second data and a second ID associated with the second data;

determine whether at least a portion of the second ID is the same as a portion of the first ID;

upon determining that the at least a portion of the second ID is the same as the portion of the first ID, determine that the reduced-fidelity version associated with the first data and the second data represent the same information with differing fidelity; and apply the modification from the reduced-fidelity version associated with the data to the first data.

5. The system of claim 1, wherein the instructions to determine the expected time at which the user associated with the first task accesses the first data comprise instructions to:

obtain a schedule associated with the user and the first task,
wherein the schedule indicates availability of the user;

based on the schedule determine a user's requirement time associated with the data,
wherein the user's requirement time indicates anticipated utilization time associated with the first data; and based on the indication of user's requirement time determine the expected time.

6. The system of claim 1, wherein the instructions to, based on the flow graph of data and the flow graph of tasks, determine the first task among the multiple tasks comprise instructions to:

obtain a correspondence between the flow graph of data and the flow graph of tasks,
wherein the correspondence indicates the first data in the flow graph of data and the first task in the flow graph of tasks depending on the data;

obtain a metadata associated with the first data, wherein the metadata indicates a place of the first data in the flow graph of data; and based on the correspondence between the flow graph of data and the flow graph of tasks and the place of the metadata in the flow graph of data, determine the first task among the multiple tasks.

7. The system of claim 1, wherein the user includes an automatic archiving system configured to store received data.

8. The system of claim 1, wherein the first data includes a video, a scan of geometry, audio, metadata, or motion capture data.

9. A method comprising:

obtaining a flow graph of tasks and a flow graph of data,
wherein the flow graph of tasks indicates multiple tasks, a particular user associated with a task in the multiple tasks, and a location associated with the particular user, wherein the flow graph of data indicates data associated with the task in the multiple tasks and a location associated with a source of the data;

obtaining first data associated with the flow graph of data and a location associated with a source of the first data;

based on the flow graph of data and the flow graph of tasks, determining a first task among the multiple tasks,
wherein the first task is an immediate task in the flow graph of tasks configured to receive the first data;

based on the first task, determining the location associated with a user associated with the first task;

based on the first task, determining an expected time at which the user associated with the first task accesses the first data;

obtaining a current time, a size associated with the first data, and network bandwidth between the location associated with the source of the first data and the location associated with the user;

based on the current time, the size associated with the first data, the network bandwidth, and the expected time, without sending the first data to the user, determining whether the first data can reach the user before the expected time; and efficiently distributing data in a cloud computing pipeline to geographically distributed users by:
upon determining that the first data cannot reach the user before the expected time, generating a reduced-fidelity version associated with the first data,
wherein the reduced-fidelity version associated with the first data occupies less memory than the first data; and sending at least a portion of the reduced-fidelity version associated with the first data to the user.

10. The method of claim 9, wherein generating the reduced-fidelity version associated with the first data comprises:

based on the current time, the size associated with the first data, the network bandwidth, and the expected time, determining an upper reduced-fidelity size associated with the reduced-fidelity version associated with the first data,
wherein a network providing the network bandwidth is configured to deliver the reduced-fidelity version having the upper reduced-fidelity size before the expected time; and based on the upper reduced-fidelity size, generating the reduced-fidelity version associated with the first data according to a criterion stored in the flow graph of tasks,
wherein the reduced-fidelity version associated with the first data occupies the same amount of memory or less memory than the memory indicated by the upper reduced-fidelity size.

11. The method of claim 9, comprising:

obtaining a first identifier (ID) associated with the reduced-fidelity version associated with the first data,
wherein the first ID uniquely identifies the reduced-fidelity version associated with the first data;

obtaining second data and a second ID associated with the second data;

determining whether at least a portion of the second ID is the same as a portion of the first ID; and upon determining that the at least a portion of the second ID is the same as the portion of the first ID, determining that the reduced-fidelity version associated with the first data and the second data represent the same information with differing fidelity.

12. The method of claim 9, comprising:
obtaining a first identifier (ID) associated with the reduced-fidelity version associated with the first data, wherein the first ID uniquely identifies the reduced-fidelity version associated with the first data;
obtaining a modification to the reduced-fidelity version associated with the first data;
obtaining second data and a second ID associated with the second data;
determining whether at least a portion of the second ID is the same as a portion of the first ID;
upon determining that the at least a portion of the second ID is the same as the portion of the first ID, determining that the reduced-fidelity version associated with the first data and the second data represent the same information with differing fidelity; and
applying the modification from the reduced-fidelity version associated with the data to the first data.

13. The method of claim 9, wherein determining the expected time at which the user associated with the first task accesses the first data comprises:
obtaining a schedule associated with the user and the first task,
wherein the schedule indicates availability of the user;
based on the schedule determining a user's requirement time associated with the data,
wherein the user's requirement time indicates anticipated utilization time associated with the first data; and
based on the indication of user's requirement time determining the expected time.

14. The method of claim 9, wherein based on the flow graph of data and the flow graph of tasks, determining the first task among the multiple tasks comprises:
obtaining a correspondence between the flow graph of data and the flow graph of tasks,
wherein the correspondence indicates the first data in the flow graph of data and the first task in the flow graph of tasks depending on the data;
obtaining a metadata associated with the first data, wherein the metadata indicates a place of the first data in the flow graph of data; and
based on the correspondence between the flow graph of data and the flow graph of tasks and the place of the metadata in the flow graph of data, determining the first task among the multiple tasks.

15. At least one computer-readable storage medium, excluding transitory signals and carrying instructions, which, when executed by at least one data processor of a system, cause the system to:
obtain a flow graph of tasks and a flow graph of data,
wherein the flow graph of tasks indicates multiple tasks, a particular user associated with a task in the multiple tasks, and a location associated with the particular user,
wherein the flow graph of data indicates data associated with the task in the multiple tasks and a location associated with a source of the data;
obtain first data associated with the flow graph of data and a location associated with the source of the first data;
based on the flow graph of data and the flow graph of tasks, determine a first task among the multiple tasks, wherein the first task is an immediate task in the flow graph of tasks configured to receive the first data;
based on the first task, determine the location associated with se-a user associated with the first task;
based on the first task, determine an expected time at which the user associated with the first task accesses the first data;
obtain a current time, a size associated with the first data, and network bandwidth between the location associated with a source of the first data and the location associated with the user;
based on the current time, the size associated with the first data, the network bandwidth, and the expected time, without sending the first data to the user, determine whether the first data can reach the user before the expected time;
efficiently distribute data in a cloud computing pipeline to geographically distributed users by:
upon determining that the first data cannot reach the user before the expected time, generating a reduced-fidelity version associated with the first data,
wherein the reduced-fidelity version associated with the first data occupies less memory than the first data; and
sending at least a portion of the reduced-fidelity version associated with the first data to the user; and
upon determining that the first data can reach the user before the expected time, send at least a portion of the first data to the user.

16. The at least one computer-readable storage medium of claim 15, wherein the instructions to generate the reduced-fidelity version associated with the first data comprise instructions to:
based on the current time, the size associated with the first data, the network bandwidth, and the expected time, determine an upper reduced-fidelity size associated with the reduced-fidelity version associated with the first data,
wherein a network providing the network bandwidth is configured to deliver the reduced-fidelity version having the upper reduced-fidelity size before the expected time; and
based on the upper reduced-fidelity size, generate the reduced-fidelity version associated with the first data according to a criterion stored in the flow graph of tasks,
wherein the reduced-fidelity version associated with the first data occupies the same amount of memory or less memory than the memory indicated by the upper reduced-fidelity size.

17. The at least one computer-readable storage medium of claim 15, comprising instructions to:
obtain a first identifier (ID) associated with the reduced-fidelity version associated with the first data,
wherein the first ID uniquely identifies the reduced-fidelity version associated with the first data;
obtain second data and a second ID associated with the second data;
determine whether at least a portion of the second ID is the same as a portion of the first ID; and
upon determining that the at least a portion of the second ID is the same as the portion of the first ID, determine that the reduced-fidelity version associated with the first data and the second data represent the same information with differing fidelity.

18. The at least one computer-readable storage medium of claim 15, comprising instructions to:
obtain a first identifier (ID) associated with the reduced-fidelity version associated with the first data,
wherein the first ID uniquely identifies the reduced-fidelity version associated with the first data;

obtain a modification to the reduced-fidelity version associated with the first data;
obtain second data and a second ID associated with the second data;
determine whether at least a portion of the second ID is the same as a portion of the first ID;
upon determining that the at least a portion of the second ID is the same as the portion of the first ID, determine that the reduced-fidelity version associated with the first data and the second data represent the same information with differing fidelity; and
apply the modification from the reduced-fidelity version associated with the data to the first data.

19. The at least one computer-readable storage medium of claim 15, wherein the instructions to determine the expected time at which the user associated with the first task accesses the first data comprise instructions to:
obtain a schedule associated with the user and the first task,
wherein the schedule indicates availability of the user;
based on the schedule determine a user's requirement time associated with the data,
wherein the user's requirement time indicates anticipated utilization time associated with the first data; and
based on the indication of user's requirement time determine the expected time.

20. The at least one computer-readable storage medium of claim 15, wherein the instructions to, based on the flow graph of data and the flow graph of tasks, determine the first task among the multiple tasks comprise instructions to:
obtain a correspondence between the flow graph of data and the flow graph of tasks,
wherein the correspondence indicates the first data in the flow graph of data and the first task in the flow graph of tasks depending on the data;
obtain a metadata associated with the first data, wherein the metadata indicates a place of the first data in the flow graph of data; and
based on the correspondence between the flow graph of data and the flow graph of tasks and the place of the metadata in the flow graph of data, determine the first task among the multiple tasks.

* * * * *